(12) United States Patent
Sugimoto et al.

(10) Patent No.: US 9,042,710 B2
(45) Date of Patent: *May 26, 2015

(54) VIDEO PROCESSING APPARATUS AND CONTROLLING METHOD FOR SAME

(75) Inventors: Kousei Sugimoto, Kawasaki (JP); Kohei Inamura, Sagamihara (JP); Toshiki Nakatani, Kawasaki (JP); Mitsuru Tada, Sagamihara (JP); Masaharu Yamagishi, Yokohama (JP); Eiichi Matsuzaki, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

This patent is subject to a terminal disclaimer.

(21) Appl. No.: 13/543,400

(22) Filed: Jul. 6, 2012

(65) Prior Publication Data

US 2012/0275760 A1      Nov. 1, 2012

Related U.S. Application Data

(63) Continuation of application No. 12/356,397, filed on Jan. 20, 2009, now Pat. No. 8,244,112.

(30) Foreign Application Priority Data

Jan. 31, 2008   (JP) ................................. 2008-021071

(51) Int. Cl.
*H04N 5/783*     (2006.01)
*H04N 5/94*      (2006.01)
*H04N 7/01*      (2006.01)
*H04N 5/76*      (2006.01)

(52) U.S. Cl.
CPC .................. *H04N 7/014* (2013.01); *H04N 5/76* (2013.01); *H04N 7/0127* (2013.01)

(58) Field of Classification Search
USPC .......................... 386/343, 345, 344, 263, 264
See application file for complete search history.

(56) References Cited

U.S. PATENT DOCUMENTS 8,244,112 B2 *    8/2012  Sugimoto et al. ............. 386/343
2008/0120674 A1 * 5/2008  Suzuki .......................... 725/118

FOREIGN PATENT DOCUMENTS

JP            404233880       *  8/1992

* cited by examiner

*Primary Examiner* — Robert Chevalier
(74) *Attorney, Agent, or Firm* — Canon U.S.A., Inc. IP Division

(57) ABSTRACT

A video processing apparatus that can be connected to a video playback apparatus includes an input unit configured to input video data from the video playback apparatus, an interpolation unit configured to generate interpolated frame image data of input video data, and an output unit configured to output the interpolated frame image data as interpolated video data, wherein the interpolation unit generates different interpolated frame image data according to a playback mode of the video playback apparatus.

16 Claims, 11 Drawing Sheets

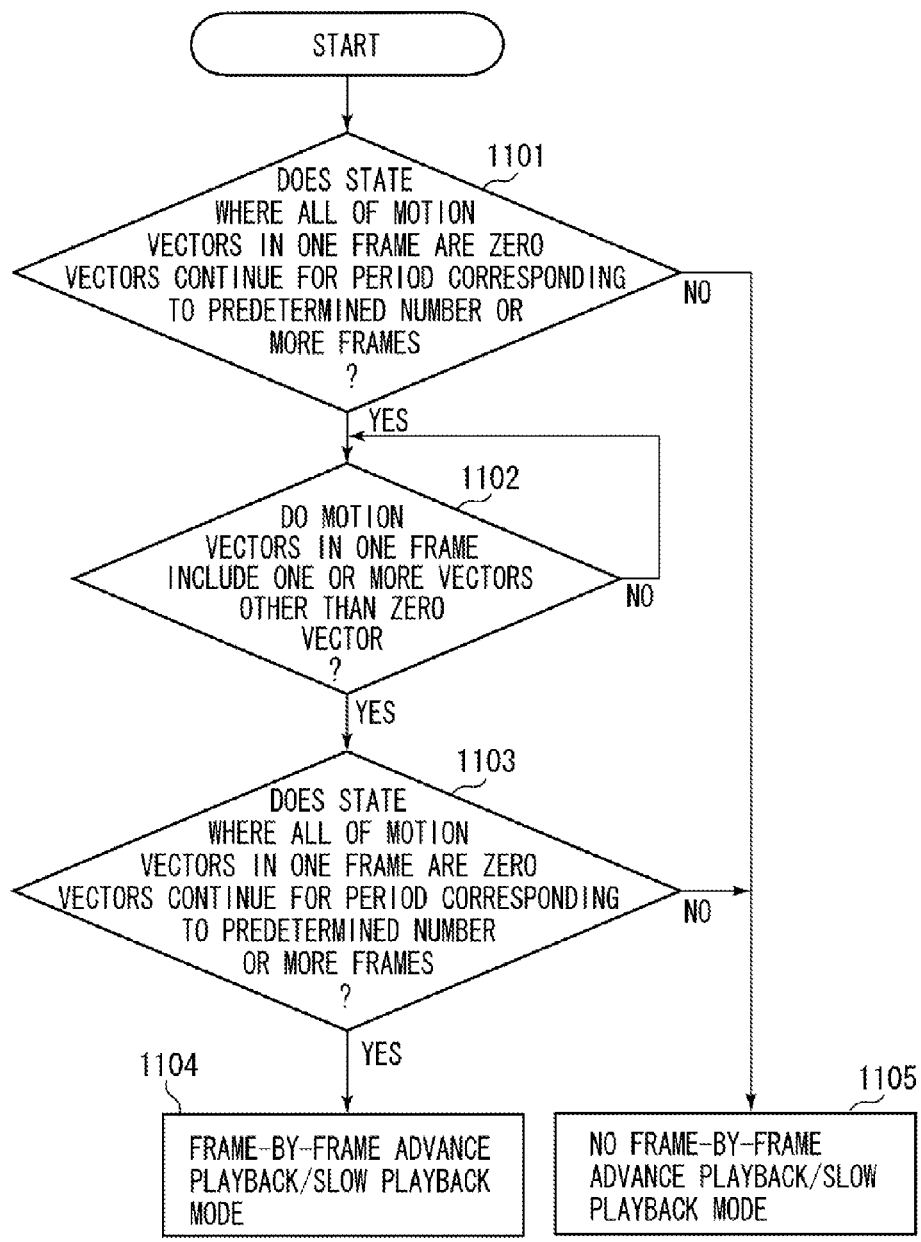

VIDEO PROCESSING APPARATUS AND CONTROLLING METHOD FOR SAME

CROSS-REFERENCE TO RELATED APPLICATIONS

This application is a continuation of U.S. patent application Ser. No. 12/356,397, filed Jan. 20, 2009, which claims the benefit of Japanese Application No. 2008-021071, filed Jan. 31, 2008, both of which are hereby incorporated by reference herein in their entirety.

BACKGROUND OF THE INVENTION

1. Field of the Invention

The present invention relates to a video processing apparatus that can be connected to a video playback apparatus, more particularly to a video processing apparatus capable of generating different interpolated frame images according to a playback mode of the video playback apparatus and performing frame rate conversion.

2. Description of the Related Art

Recently, video equipment conducts frame rate conversion to display an image at a higher frame rate in order to suppress blur and flicker of moving images.

Japanese Patent Application Laid-Open No. 2001-054066 describes an image display system that differentiates the decoding process speed of a moving image read from a digital versatile disk (DVD) media between a standard playback mode and a special playback mode. Such processing can reduce the processing amount in slow playback, and can provide a smooth display when fast-forward playback is performed.

Japanese Patent Application Laid-Open No. 03-263989 also describes a technique of obtaining a motion vector from the preceding and subsequent frames, and using the motion vector to generate interpolation data as a method for generating interpolated frames in frame rate conversion processing.

A frame rate conversion method in the conventional video processing apparatus, however, has a problem that a smooth image is not always displayed when video data is input in the special playback mode. This problem is in particular described as follows:

(1) In a Case of Fast-Forward Playback (FIG. 2)

When playback is carried out in the normal playback mode, frame images from input image data are continuously transferred into a frame rate converter as images n0, n1, and n2. On the other hand, when the fast-forward playback is carried out, the frame images from the input image data are thinned to be images n0, n10, and n20 and transferred into the frame rate converter. In this case, the frame rate converter generates an interpolated frame image n0' from images n0 and n10, and an interpolated frame image n10' from images n10 and n20. When an interpolated frame image is generated from a frame image temporarily separated as described above, an interpolation error can easily occur because of lower correlation between frames. When an image is generated and displayed with the interpolation error, smoothness of a moving image is impaired.

(2) In a Case of Frame-by-Frame Advance Playback (FIG. 3)

When a frame-by-frame advance playback is carried out, a frame image n0 of an input video is input to a frame rate converter until the user starts to perform the frame-by-frame advance playback. When the user starts to perform the frame-by-frame advance playback (at the time of the user action in FIG. 3), the next frame image n1 is input. The frame rate converter generates an interpolated frame image n0' from frame images n0 and n1 at a time when the frame is changed after the user performs a playback action. Although the user wants to sequentially view each frame of the input video in frame-by-frame advance playback, the interpolated frame image 0' that does not originally exist is displayed.

(3) In a Case of Slow Playback (FIG. 4)

When a slow playback is carried out at a half speed, the same frame is input to the frame rate converter successively twice such as n0, n0, n1, n1, and n2, n2. The frame rate converter generates an interpolated frame image n0' from frame images n0 and n1, and an interpolated frame image n1' from frame images n1 and n2.

Frame rate images output from the frame rate converter are images n0, n0, n0, n0', n1, n1, n1, n1', and n2, n2, n2. In other words, the same images alternatively appear a different number of times such as thrice (n0), once (n0'), thrice (n1), once (n1'), and thrice (n2). When times of display of the same frame are different, the motion image is displayed with poor smoothness.

SUMMARY OF THE INVENTION

The present invention is directed to a video processing apparatus that can provide smooth display of a motion image by selectively generating an interpolated frame image even when video data is input in a special playback mode.

According to an aspect of the present invention, a video processing apparatus that can be connected to a video playback apparatus includes an input unit configured to input video data from the video playback apparatus, an interpolation unit configured to generate interpolated frame image data of input video data, and an output unit configured to output video data interpolated with the interpolated frame image data, wherein the interpolation unit generates different interpolated frame image data according to a playback mode of the video playback apparatus.

According to an exemplary embodiment of the present invention, the video processing apparatus can conduct frame rate conversion so as to provide a smooth motion image display even when video data is input in a special playback mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates a flow chart describing an operation of a special playback detection unit illustrated in FIG. 9.

DETAILED DESCRIPTION OF THE EMBODIMENTS

Various exemplary embodiments, features, and aspects of the invention will be described in detail below with reference to the drawings.

Figure 1:
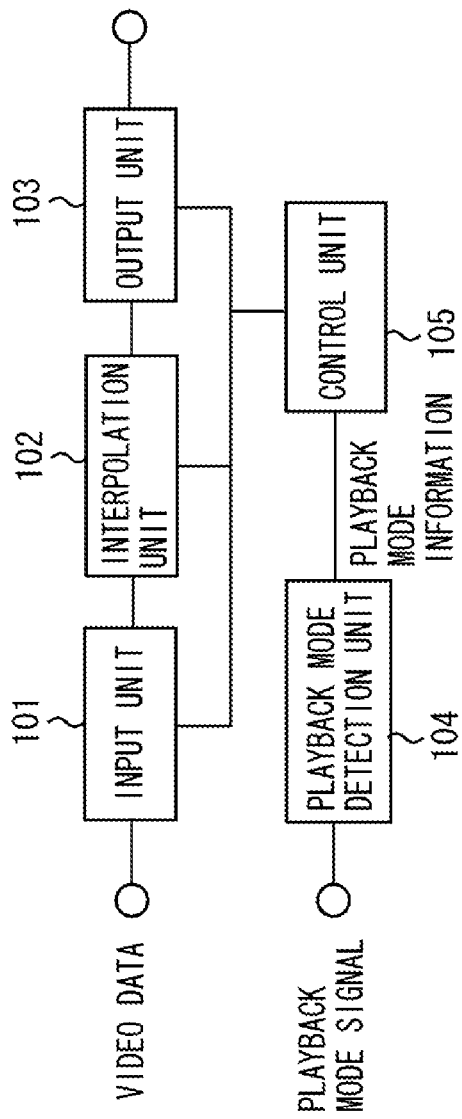
FIG. 1 is a block diagram of a video processing apparatus according to an exemplary embodiment of the present invention.
Figure 2:
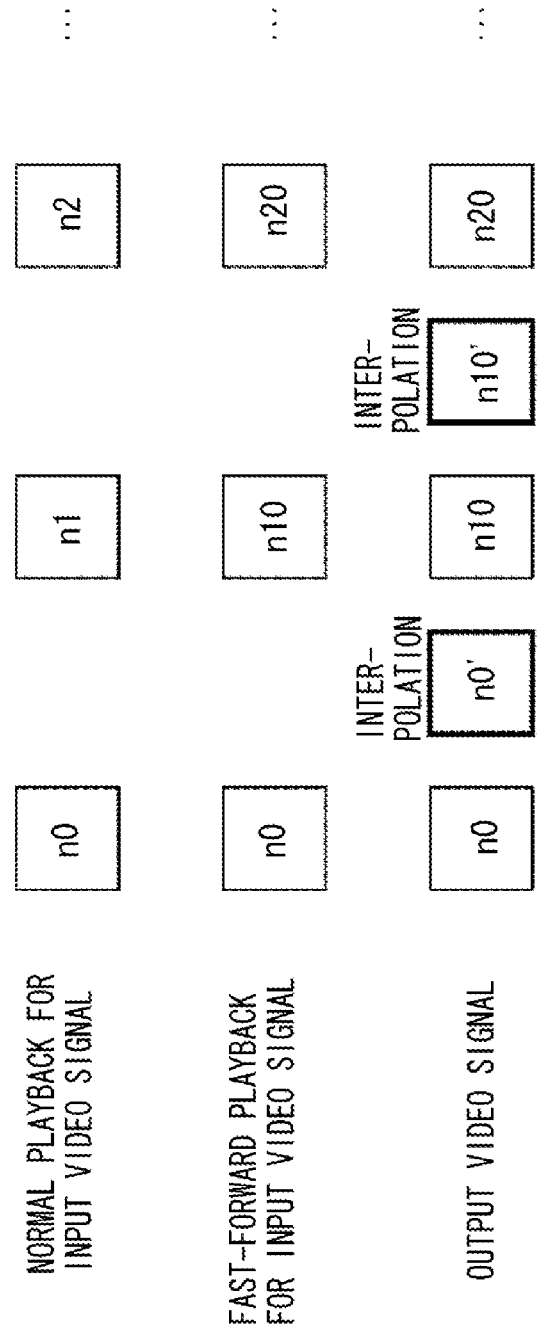
FIG. 2 is an explanatory diagram of the conventional technique in which input video data is reproduced in fast-forward playback.
Figure 3:
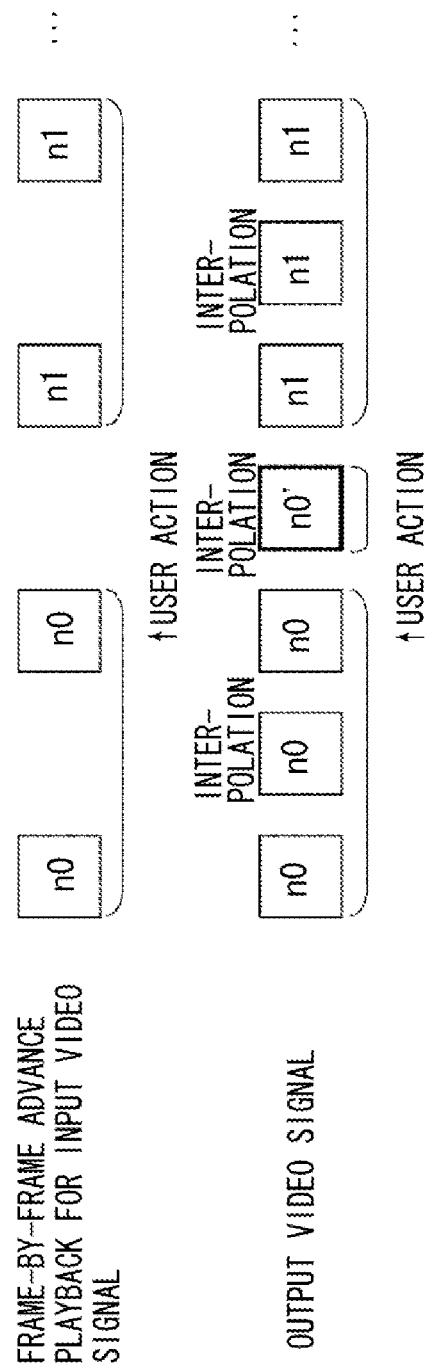
FIG. 3 is an explanatory diagram of the conventional technique in which input video data is reproduced in frame-by-frame advance playback.
Figure 4:
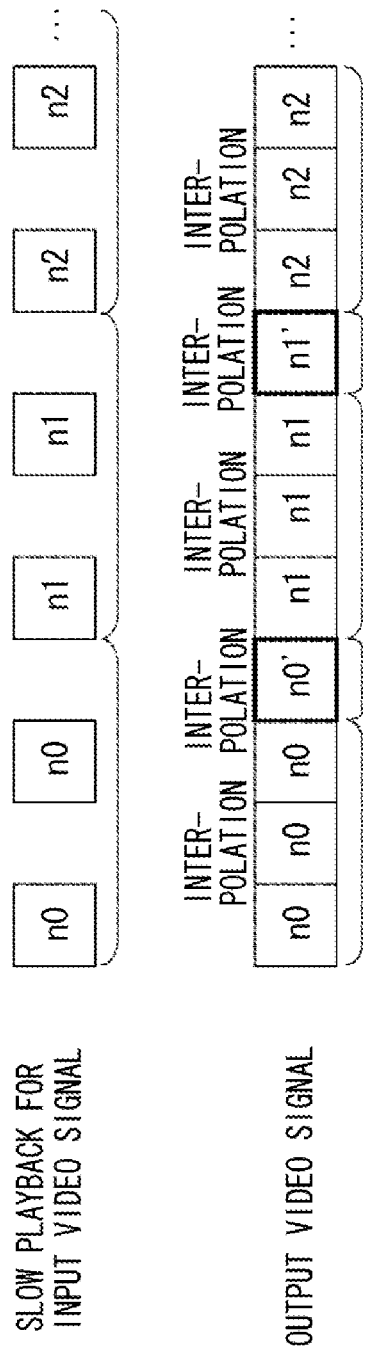
FIG. 4 is an explanatory diagram of the conventional technique in which input video data is reproduced in slow playback.

FIG. 1 is a block diagram of a video processing apparatus that can be connected to a video playback apparatus according to an exemplary embodiment of the present invention. Video data at a frame rate of 60 Hz is output from the video playback apparatus and input to an input unit 101.

The video playback apparatus includes a video recorder, a video player, a digital camera, and a digital video camera.

An interpolation unit 102 conducts frame interpolation processing on input video data, and outputs the input video data as video data at a frame rate of 120 Hz. An output unit 103 outputs the video data that is frame rate converted in a predetermined video format, to a display apparatus.

A playback mode detection unit 104 receives a playback mode signal from the video playback apparatus and outputs playback mode information to a control unit 105. The playback mode information is information about playback mode of the video playback apparatus selected by user operation. The playback mode includes a normal playback mode and a special playback mode such as fast-forward playback mode, slow playback mode, and frame-by-frame advance playback mode.

The interpolation unit 102 generates different interpolated frame images according to the playback mode information based on the control by a control unit 105 (MPU) as described below.

When the video playback apparatus is connected to the video processing apparatus via a digital interface such as a high-definition multimedia interface (HDMI), the video playback apparatus can be controlled by the operation of the video processing apparatus. In other words, a playback mode detection unit 104 detects a playback signal transmitted by a user via a remote control of the video processing apparatus.

The detected playback mode information is notified to the video playback apparatus via a consumer electronics control (CEC) line of the HDMI, and a playback unit of the video playback apparatus plays back a recorded video data based on the playback mode information.

Figure 5:
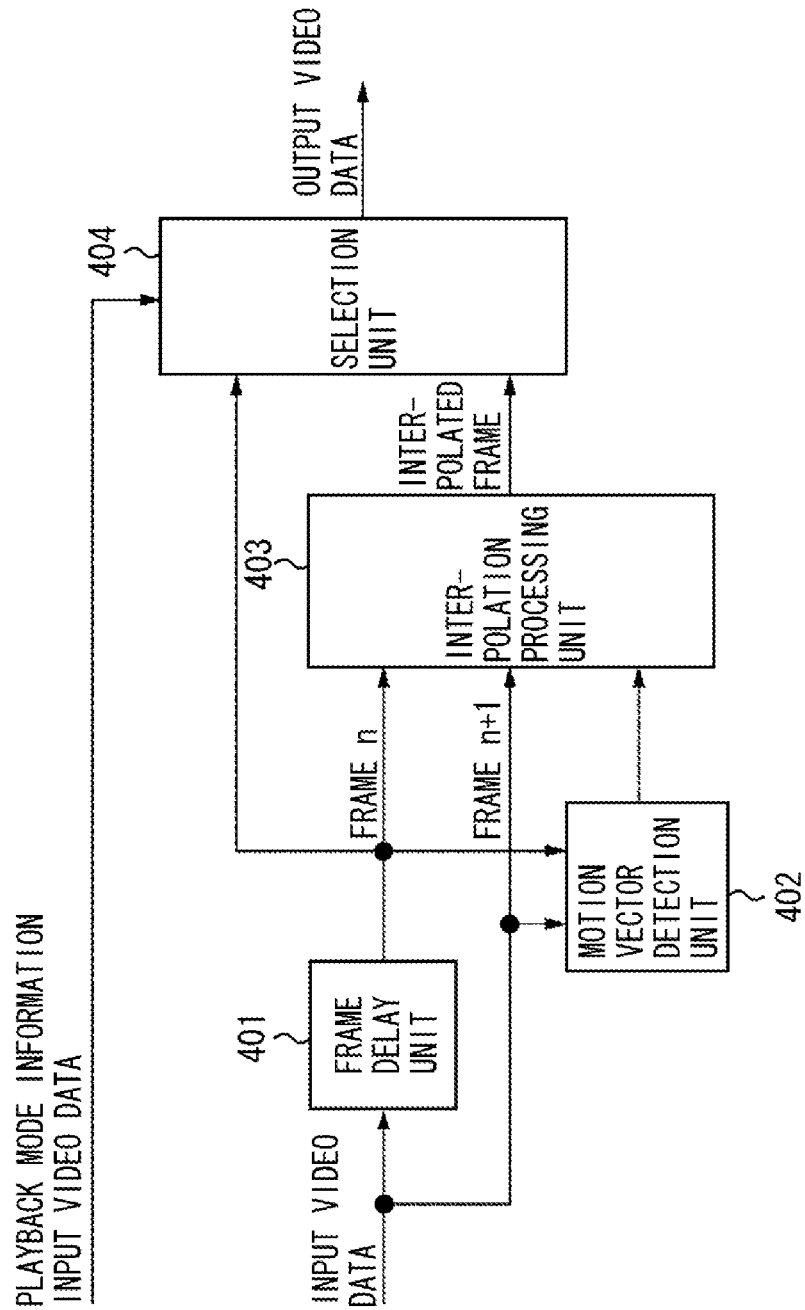
FIG. 5 is a block diagram of a correction unit according to an exemplary embodiment of the present invention.

FIG. 5 is a block diagram illustrating a structure of the interpolation unit 102.

A motion vector detection unit 402 obtains a motion vector from the frame n+1 and the frame n delayed in a frame delay unit 401. As a method for obtaining a motion vector, block-matching is often used which will be described below. The frame n is separated into a block, each consisting of 16×16 pixels. Then, a search range of 48×48 pixels is moved pixel by pixel from the same position of the search block on the frame n+1, and a position is sought where a sum of the absolute difference is the smallest. The difference between the sought position and the original block position becomes a motion vector.

The interpolation processing unit 403 generates an interpolated frame image from the motion vector, an image of the frame n in the input video data, and an image of the frame n+1. More specifically, each pixel value of a block at the frame n and a block at the destination frame n+1 is averaged and pasted at a position of one half of the motion vector on the interpolated frame. In other words, the averaged frame image is generated using a plurality of frame images of the input video data.

A selection unit 404 selectively outputs video data output from the frame delay unit 401 and the averaged interpolated frame image data generated at the interpolation processing unit 403 according to the playback mode information. In a case of the normal playback mode, the selection unit 404 outputs image data of double frame rate by alternatively outputting the input video data and the averaged interpolated frame image data. In a case of the special playback mode, the averaged interpolated frame image data is not output but image data of double frame rate is output by producing an output of the second consecutive input video data as the interpolated frame image data.

In other words, in case of the normal playback mode, the interpolation unit 102 uses a plurality of frame images of the input video data to generate interpolated frame images that are different from the frame image of the input video data. In a case of the special playback mode, the interpolation unit 102 generates the interpolated frame images similar to the frame image of the input video data.

Linking the frame images displayed by the above operation is described below for each of the special playback modes.

Figure 6:
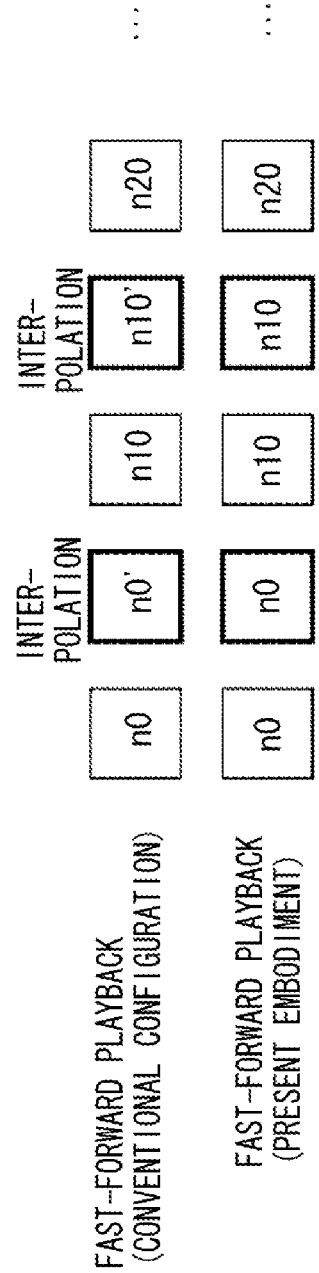
FIG. 6 is an explanatory diagram describing a display image of the present invention when an input video signal is reproduced in a fast-forward playback.

In a case of the fast-forward playback mode, frame rate conversion can be performed without displaying the interpolated frame images n0' and n10' by issuing a preceding frame image to the position of the interpolated frame as FIG. 6 illustrates.

Figure 7:
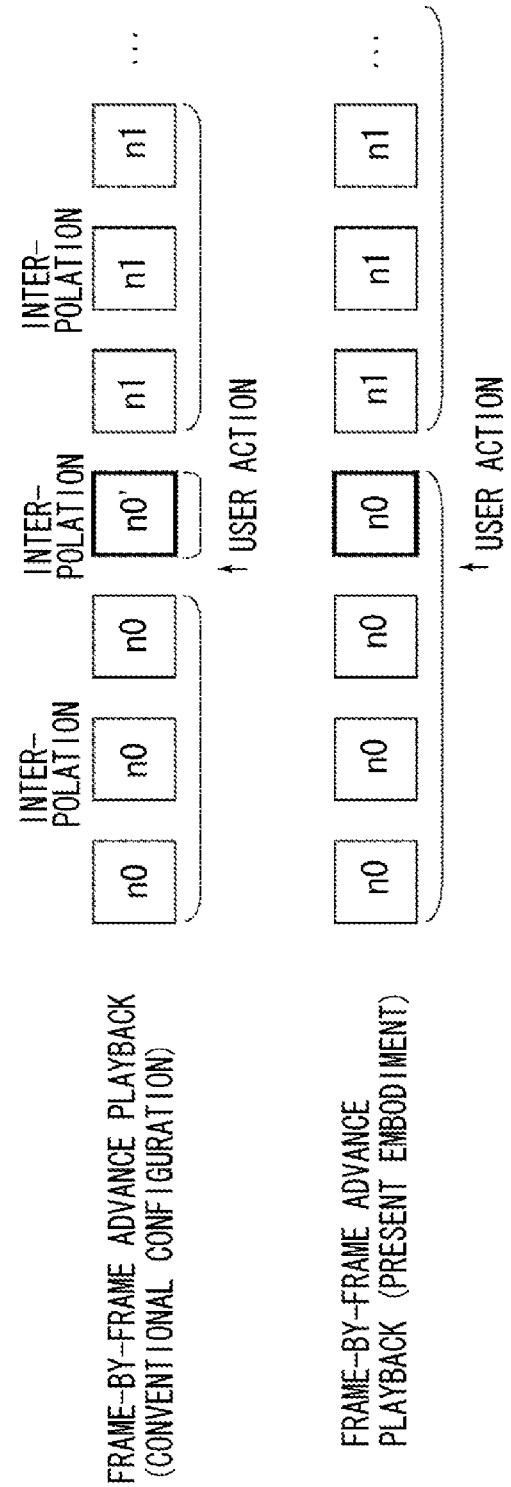
FIG. 7 is an explanatory diagram describing a display image according to the exemplary embodiment of the present invention when an input video signal is reproduced in frame-by-frame advance playback.

In a case of the frame-by-frame advance playback mode, frame rate conversion can be performed by issuing a preceding frame image to the position of the interpolated frame without displaying the interpolated frame image n0' that is absent in the output video data as FIG. 7 illustrates.

Figure 8:
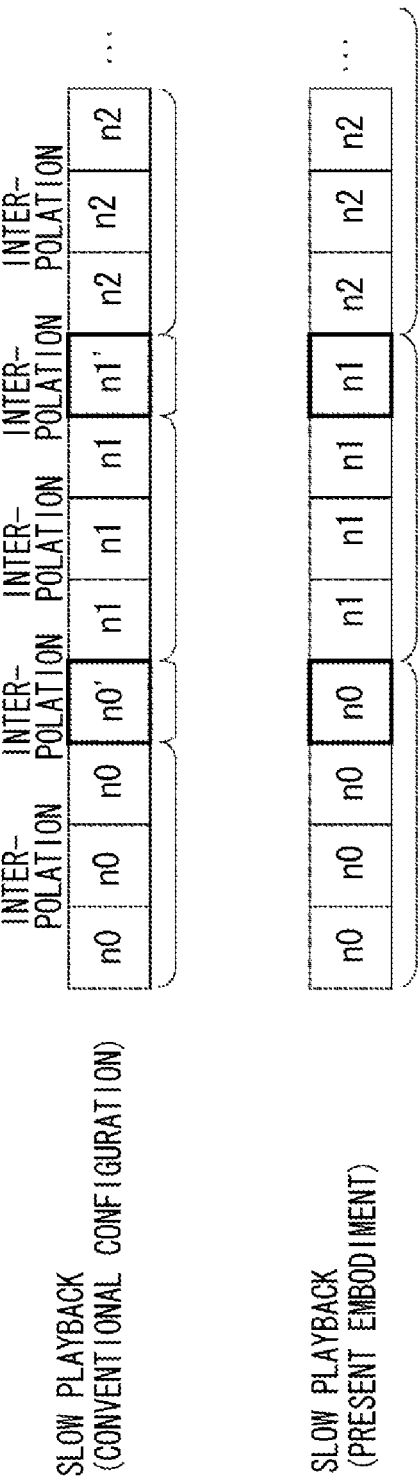
FIG. 8 is an explanatory diagram describing a display image according to the exemplary embodiment of the present invention when an input video signal is reproduced in slow playback.

In a case of the slow playback mode, the same frame image is evenly repeated four times by issuing a preceding frame to the position of the interpolated frame as FIG. 8 illustrates. According to the present exemplary embodiment, as described above, frame rate conversion is performed by the motion vector interpolation when input video data is not reproduced in special playback. On the other hand, the averaged interpolated frame is not output, but input video data is output twice when input video data is reproduced in special playback. Thus, breakdown of the interpolated images at the time of fast-forward playback, display of the interpolated frame at the time of frame-by-frame advance playback, and unnatural motions at the time of slow playback can be prevented.

According to the second exemplary embodiment of the present invention, the special playback detection unit detects the playback mode information without receiving the same from the outside.

Figure 9:
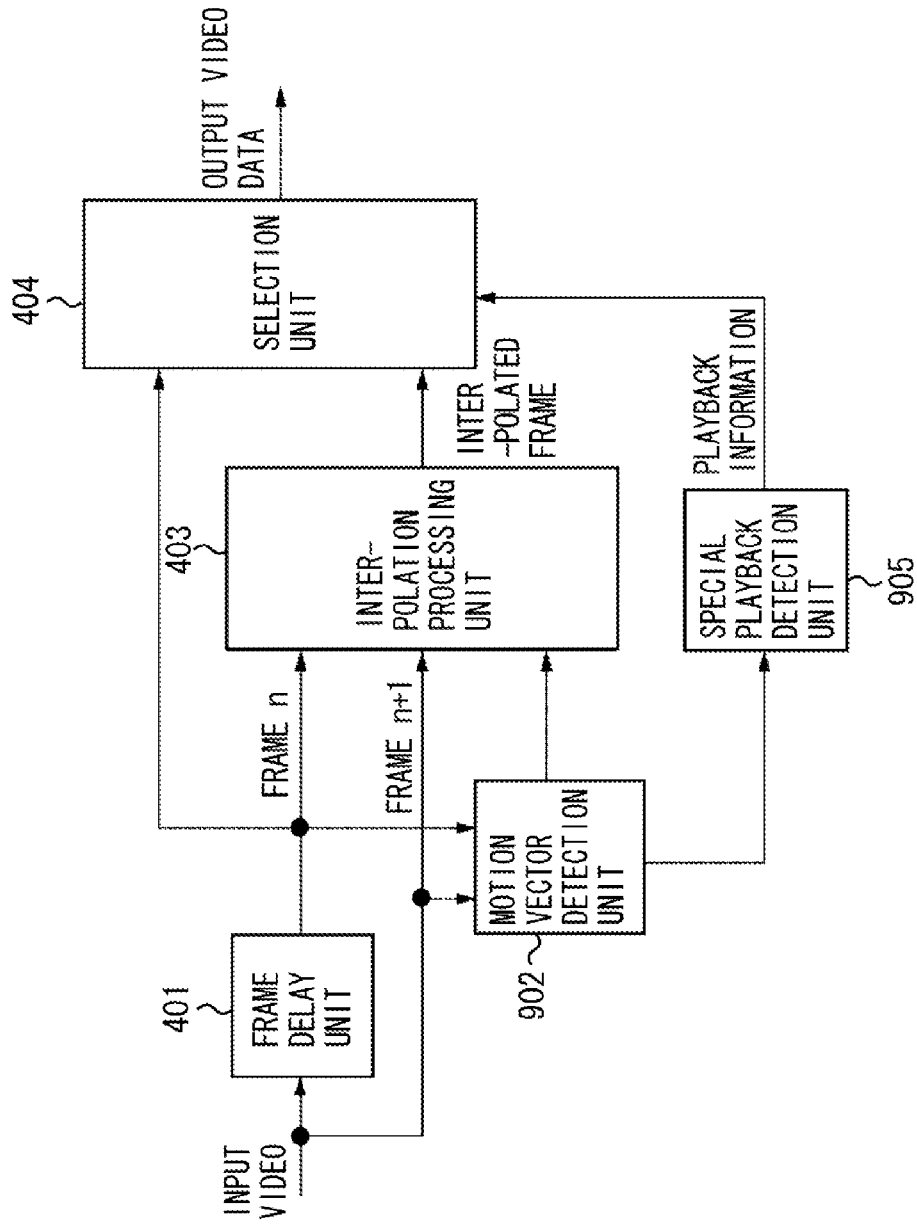
FIG. 9 is a block diagram of a video processing apparatus according to another exemplary embodiment of the present invention.

FIG. 9 is a block diagram of the interpolation unit 102 according to the present exemplary embodiment.

The motion vector detection unit 902 detects motion vectors similar to the first exemplary embodiment. The motion vector detection unit also determines reliability of the motion vector. The reliability of the motion vector is determined by a sum of the absolute difference between a block of the frame n and a block of the frame n+1. When the sum is a constant value or higher, the unit determines that no reliability of the motion vectors is present because the block of the frame n and the block of the frame n+1 are not similar to each other. When the sum is lower than the constant value, the unit determines the reliability to be present.

The special playback detection unit 905 detects whether the playback mode is the special playback mode, considering the motion vectors and the reliability of the motion vectors detected by the motion vector detection unit 902. The operation of the special playback detection unit 905 is described using flow charts illustrated in FIGS. 10 and 11.

Figure 10:
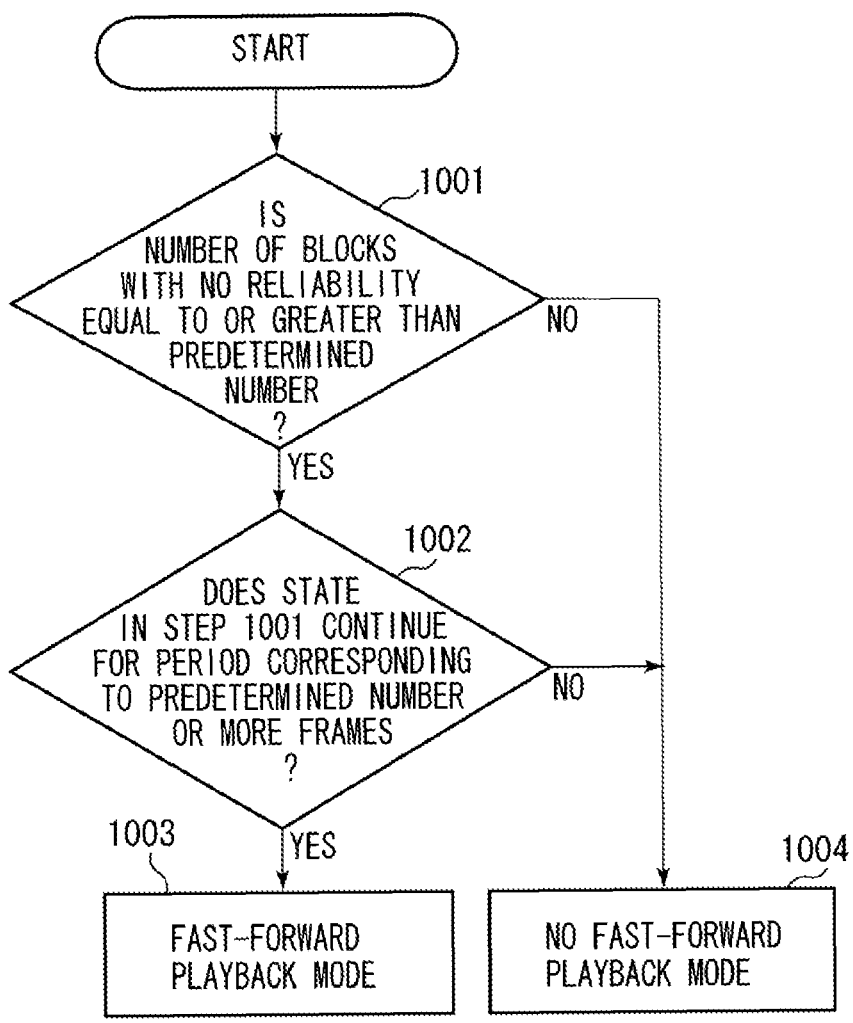
FIG. 10 illustrates a flow chart describing an operation of a special playback detection unit illustrated in FIG. 9.

FIG. 10 is a flow chart describing procedures for detecting the fast-forward playback mode among the special playback mode.

In step 1001, the special playback detection 905 counts block numbers of the motion vectors that shows no reliability within one frame. When the counted value is less than the predetermined number (NO in step 1001), the processing proceeds to step 1004. In step 1004, the special playback detection unit determines the playback mode is not the fast-forward playback mode. When the counted value is a predetermined number or more (YES in step 1001), the processing proceeds to step 1002. In step 1002, the special playback detection unit 905 determines whether a state where the counted value is the predetermined number or more, continues for a period corresponding to the predetermined frame number or more. When the state continues for a period corresponding to the predetermined frame number or more (YES in step 1002), the processing proceeds to step 1003. In step 1003, the special playback detection unit 905 determines that the playback mode is the fast-forward playback mode. If the state does not continue for the period corresponding to the predetermined number or more frames (NO in step 1002), the processing proceeds to step 1004. In step 1004, the special playback detection unit 905 determines that the playback mode is not the fast-forward playback mode.

Accordingly, the special playback detection unit 905 detects whether the playback mode is the fast-forward playback mode.

Next, the procedures for detecting the frame-by-frame advance playback mode and the slow payback mode are described using the flow chart illustrated in FIG. 11.

In step 1101, the special playback detection unit 905 detects whether a state where the motion vectors in the frame are all zero vectors (no motion), continues for a period corresponding to the predetermined frame number. If the state does not continue for the period corresponding to the predetermined frame number (NO in step 1101), the processing proceeds to step 1105. In step 1105, the special playback detection unit 905 determines that the playback mode is neither the frame-by-frame advance playback nor the slow playback mode. When the state continues for the period of the predetermined frame number (YES in step 1101), the processing proceeds to step 1102.

In step 1102, the special playback detection unit 905 determines whether the motion vectors within one frame contain vectors other than a zero vector. When the motion vectors do not contain vectors other than a zero vector (i.e., all zero vectors) (NO in step 1102), the special playback detection unit 905 repeats step 1102 until the frames containing vectors other than a zero vector are detected. When the motion vectors contain vectors other than zero vectors (YES in step 1102), the processing proceeds to step 1103.

In step 1103, the special playback detection unit 905 determines whether a state where the motion vectors within one frame are all zero vectors (no motion), continues for a period corresponding to the predetermined frame number. When the state does not continue for the period of the predetermined frame number (NO in step 1103), the processing proceeds to step 1105. In step 1105, the special playback detection unit 905 determines that the playback mode is neither the frame-by-frame advance playback mode nor the slow playback mode. When the state continues for the period of the predetermined frame number (YES in step 1103), the processing proceeds to step 1104. In step 1104, the special playback detection unit 905 determines that the playback mode is the frame-by-frame advance playback mode or the slow playback mode.

The special playback detection unit 905 decides that the playback mode information is the special playback mode when two results of the above determination indicate the fast forward playback mode or the frame-by-frame advance playback mode/the slow playback mode. When these results do not indicate the fast forward playback mode and the frame-by-frame advance playback mode/the slow playback mode, the special playback detection unit 905 determines that the playback mode information is not the special playback mode.

The selection unit 404 determines the frame to be issued to the position of the interpolated frame based on the playback mode information similar to the first exemplary embodiment.

According to the present exemplary embodiment as described above, the motion vectors are obtained from the video signals, and the playback information is detected based on the motion vector information. Even if no playback mode information is instructed from outside, frame rate conversion can be performed according to the playback mode.

Although the above embodiment describes the processing per frame unit for the sake of simplification, the processing can also be provided per field unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A video processing apparatus that can be connected to a video source, the video processing apparatus comprising:

an input unit configured to input video data from the video source;

an interpolation unit configured to generate interpolated frame image data of input video data; and an output unit configured to output video data interpolated with the interpolated frame image data, wherein the interpolation unit generates the interpolated frame image data by using a plurality of frame image data of the input video data when a playback state of the input video data is a normal playback state, and the interpolation unit generates the interpolated frame image data that is substantially the same as the frame image data of the input video data when the playback state of the input video data is a special playback state.

2. The video processing apparatus according to claim 1, wherein the special playback state includes at least one of fast-forward playback state, slow playback state, and frame-by-frame advance playback state.

3. The video processing apparatus according to claim 1, wherein the video source and the video processing apparatus are connected by using a high-definition multimedia interface (HDMI), and
wherein playback state information indicating the playback state of the video data is notified from the video source to the video processing apparatus via consumer electronics control (CEC) lines of the HDMI.

4. The video processing apparatus according to claim 1, further comprising a motion vector detection unit configured to detect motion vectors relative to the plurality of frame images of input video data,
wherein the interpolation unit generates the interpolated frame image data by using a plurality of frame image data of input video data based on the motion vectors detected by the motion vector detection unit.

5. The video processing apparatus according to claim 4, wherein the motion vector detection unit detects each motion vector for each of a plurality of blocks in each of the plurality of frame images of the input video data,
the video processing apparatus further comprising a determination unit configured to determine that the playback state of the video data is a fast-forward playback state in a case where an equal or larger than a predetermined number of the frame images, in each of which are included an equal or larger than a predetermined number of blocks each having a motion vector which is detected by the motion vector detection unit and of which reliability is lower than a standard level, continue.

6. The video processing apparatus according to claim 4, further comprising a determination unit configured to determine that the playback state of the video data is either a slow playback state or a frame-by-frame advance playback state in a case where an equal or larger than a predetermined number of the frame images, of which the motion vectors detected by the motion vector detection unit is zero, continue.

7. A method for controlling a video processing apparatus that can be connected to a video source, the method comprising:
inputting video data from the video source;
generating interpolated frame image data of input video data; and
outputting video data interpolated with the interpolated frame image data,
wherein the generating interpolated frame image data of input video data comprises generating the interpolated frame image data by using a plurality of frame image data of the input video data when a playback state of the input video data is a normal playback state, and generating the interpolated frame image data that is substantially the same as the frame image data of the input video data when the playback state of the input video data is a special playback state.

8. The method according to claim 7, wherein the special playback state includes at least one of fast-forward playback state, slow playback state, and frame-by-frame advance playback state.

9. The method according to claim 7, wherein the video source and the video processing apparatus are connected by using a high-definition multimedia interface (HDMI), and
wherein playback state information indicating the playback state of the video data is notified from the video source to the video processing apparatus via consumer electronics control (CEC) lines of the HDMI.

10. The method according to claim 7, further comprising:
detecting motion vectors relative to the plurality of frame images of input video data,
wherein the generating interpolated frame image data comprises generating the interpolated frame image data by using a plurality of frame image data of input video data based on the motion vectors detected in the detecting step.

11. The method according to claim 10, wherein the detecting motion vectors comprises detecting each motion vector for each of a plurality of blocks in each of the plurality of frame images of the input video data, and further comprising:
determining that the playback state of the video data is a fast-forward playback state in a case where an equal or larger than a predetermined number of the frame images, in each of which are included an equal or larger than a predetermined number of blocks each having a motion vector which is detected in the detecting step and of which reliability is lower than a standard level, continue.

12. The method according to claim 10, further comprising:
determining that the playback state of the video data is either a slow playback state or a frame-by-frame advance playback state in a case where an equal or larger than a predetermined number of the frame images, of which the motion vectors detected in the detecting step is zero, continue.

13. The video processing apparatus according to claim 1, wherein the video source is a video playback apparatus.

14. The video processing apparatus according to claim 1, wherein the playback state is a playback mode.

15. The method according to claim 7, wherein the video source is a video playback apparatus.

16. The method according to claim 7, wherein the playback state is a playback mode.

* * * * *